United States Patent
Lorincz

[11] Patent Number: 5,890,276
[45] Date of Patent: Apr. 6, 1999

[54] APPARATUS AND METHOD FOR INSERTION OF PICTURE HANGERS

[75] Inventor: Eugene M. Lorincz, Cinnaminson, N.J.

[73] Assignee: Moore Push-Pin Company, Wyndmoor, Pa.

[21] Appl. No.: 389,684

[22] Filed: Feb. 16, 1995

Related U.S. Application Data

[63] Continuation of Ser. No. 864,656, Apr. 7, 1992, abandoned.

[51] Int. Cl.$^6$ ...................................................... B23P 21/00
[52] U.S. Cl. .............................. 29/564.6; 29/565; 29/798; 227/91
[58] Field of Search .......................... 29/417, 432, 432.1, 29/432.2, 33 K, 564, 564.1, 564.6, 565, 566, 566.1, 798; 227/82, 83, 86, 87, 89, 91

[56] References Cited

U.S. PATENT DOCUMENTS

| | | | |
|---|---|---|---|
| 1,761,640 | 6/1930 | Palmgren | 227/86 |
| 2,174,708 | 10/1939 | Sears et al. | 227/86 |
| 2,617,098 | 11/1952 | Lenart et al. . | |
| 3,319,863 | 5/1967 | Dritz | 227/82 X |
| 3,711,922 | 1/1973 | Busler et al . | |
| 3,722,062 | 3/1973 | Gharaibeh . | |
| 3,837,069 | 9/1974 | Nordgren | 29/525.1 X |
| 3,961,408 | 6/1976 | Goodsmith et al . | |
| 3,969,811 | 7/1976 | Zahn . | |
| 4,224,731 | 9/1980 | Lingle . | |
| 4,292,727 | 10/1981 | Maxner . | |
| 4,429,456 | 2/1984 | Zahn . | |
| 4,514,901 | 5/1985 | Kirby . | |
| 4,785,529 | 11/1988 | Pamer et al. . | |
| 4,785,531 | 11/1988 | Roy et al. . | |
| 5,048,788 | 9/1991 | Lorincz . | |

*Primary Examiner*—Joseph M. Gorski
*Attorney, Agent, or Firm*—William H. Eilberg

[57] ABSTRACT

Picture hangers having prongs become automatically inserted into a picture backing material. An insertion apparatus feeds a strip of preformed blanks to an anvil which severs the blanks and presses them into the backing material. At the same time that the apparatus severs the first blank of the strip, a prong forming tool, attached to the anvil, bends the prongs of the next blank. A feed rod advances the strip of blanks through the apparatus, one blank at a time. A pair of paws, attached to the anvil, carry the severed hanger to the picture backing, and releases the hanger as the hanger becomes inserted into the backing. The apparatus includes a resilient structure which enables the device to operate efficiently with picture backings having varying thicknesses. One can also use the invention to insert hangers into picture frames, mirrors, plaques, signs, or the like.

5 Claims, 6 Drawing Sheets

APPARATUS AND METHOD FOR INSERTION OF PICTURE HANGERS

This application is a continuation of application Ser. No. 07/864,656, filed Apr. 7, 1992, and now abandoned.

BACKGROUND OF THE INVENTION

This invention relates to the field of insertion of picture hangers into-picture backing materials. The invention deals especially with picture hangers having prongs which become embedded in a picture backing material.

U.S. Pat. No. 5,048,788 shows a hanging device intended for use with a hardboard material. Such hardboard materials commonly form the backing material for pictures and other articles suspended from walls. The patented hanging device includes a generally flat body defining at least one opening, and a plurality of prongs integrally formed with the body, and extending away from the plane of the body. The prongs permit the secure insertion of the hanging device into the hardboard (or other) material. After insertion of the hanging device, one bends a portion of the body away from the hardboard, and the opening in the body then provides means for hanging the picture from a nail. This description hereby incorporates by reference the disclosure of the above-cited patent.

The hanger shown in the above-cited patent typically comes from a strip of pre-cut stock. One begins with a flat metal strip, and punches the strip with a progressive die. A progressive die includes a punch and die assembly which moves from one location to the next. In this case, the progressive die moves along the strip, forming each portion of the initially solid strip into a hanger blank. Thus, the strip, which comprises the input to the apparatus of the present invention, contains a plurality of such pre-formed blanks, integral with each other. One thus forms each hanger by forming the prongs of each blank into the desired orientation, and then severing the blank from the strip.

This specification generally uses the term "blank" to refer to the unfinished hanger while it still forms part of the strip. The specification generally uses the term "hanger" to refer only to the completed and severed hanger that becomes embedded in a picture backing.

One can use a hammer or similar tool to insert the hanger described above. However, using a hammer has the disadvantage that it tends to bend the prongs in an undesired manner. Also, when one uses a hammer, the prongs tend not to enter the hardboard material in a controlled and predictable manner.

Others have used a hand-operated press to insert the above-described hangers. The press eliminates or reduces the disadvantage of the hammer. But the press operates slowly; one can insert only one hanger, into the picture backing, at one time, because one can load only one hanger into the press at one time. The time consumed in operating the press increases the cost of production dramatically, especially in applications where one wants to insert thousands of such hangers in a day.

The present invention solves the problems described above by providing an apparatus and method for automatically inserting hangers into picture backing materials. The invention starts with a strip of hanger blanks, forms the prongs in each blank, severs the blank to form a finished hanger, and inserts the hanger into the picture backing. The invention therefore greatly enhances the efficiency of the insertion process.

SUMMARY OF THE INVENTION

The apparatus of the present invention feeds a strip of pre-formed blanks to an anvil which severs the blanks and presses them into a picture backing material. A feed rod pushes the blanks through the apparatus. A vertically-movable anvil includes means for severing the first blank from the strip and pressing the blank into the picture backing material. The apparatus also includes a prong forming tool, firmly attached to the anvil, for forming the prongs of the blank immediately adjacent to the first blank. Forming the prongs means bending the prongs out of the plane of the body of the blank, so that the prongs will firmly grasp the backing material when pressed into the backing.

Thus, in the method of the present invention, one pushes a strip of picture hanger blanks through the apparatus, into a position such that the first blank rests immediately below the anvil. The anvil then moves downward, severing the first blank, carrying the severed blank (now a hanger) to the picture backing, and pressing it into the backing. As the anvil moves downward, the prong forming tool simultaneously forms the prongs of the next blank. The anvil then retracts, and one advances the strip through the apparatus, through a distance of one blank.

The anvil includes a pair of paws which hold the severed hanger. Due to their construction, the paws release the hanger just as the hanger becomes pressed into the picture backing, and just before the anvil moves to its retracted position.

The invention accommodates picture backing materials of varying thicknesses in the following manner. One moves the anvil downward by an amount greater than that necessary to insert the hanger. The excess downward movement of the anvil generates, through mechanical connections, an oppositely directed force which the apparatus absorbs by means of a spring. Thus, one can insure the complete insertion of each hanger, and the complete formation of prongs for each blank, regardless of the thickness of a particular picture backing material.

The invention therefore has the primary object of providing an apparatus and method for automatic insertion of hangers into picture backing materials.

The present invention has the further object of reducing the amount of labor required to insert hangers into picture backing materials.

The present invention has the further object of providing an apparatus and method for virtually simultaneously forming the prongs of a picture hanger blank and inserting a hanger into a picture backing material.

The invention has the further object of providing an apparatus as described above, wherein the same apparatus accommodates picture backing materials of varying thicknesses.

The person of ordinary skill in the art will recognize other objects and advantages of the invention, from a reading of the following brief description of the drawings, the detailed description of the invention, and the appended claims.

DETAILED DESCRIPTION OF THE INVENTION

Figure 1:
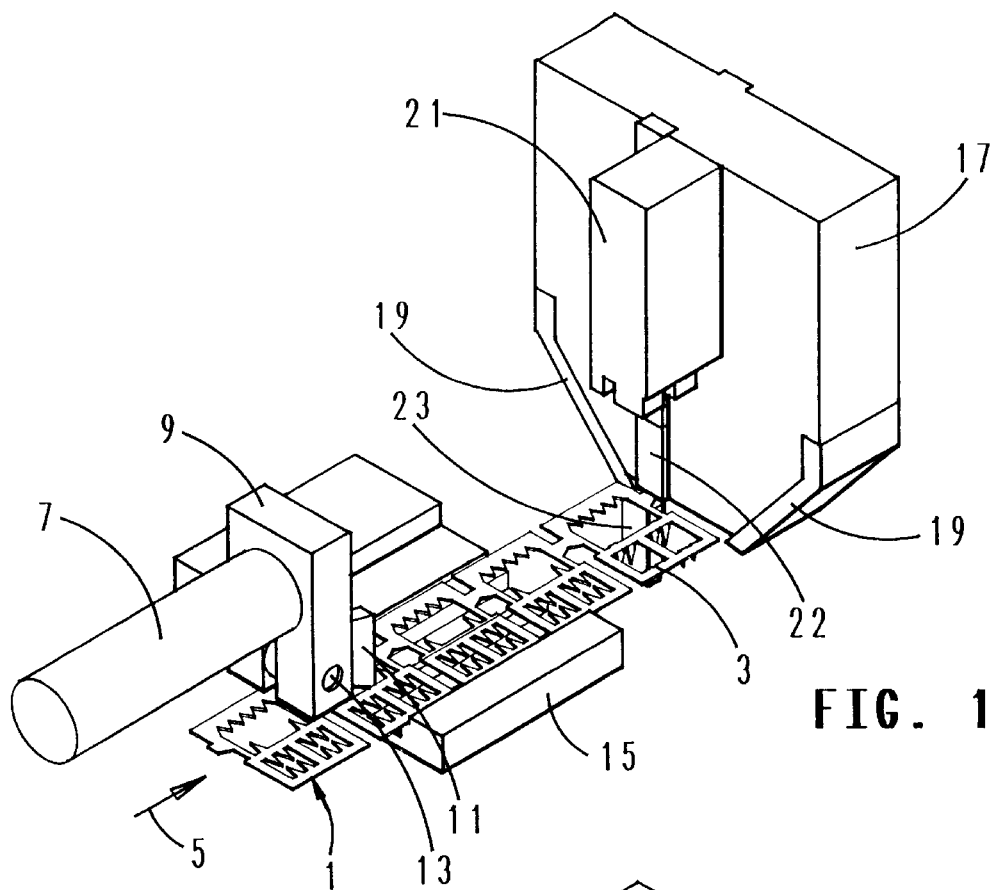
FIG. 1 shows the apparatus of the present invention, in a perspective view, with the feed rod and the anvil in their retracted positions, and showing the strip of hanger blanks upon which the apparatus operates.

FIG. 1 shows some of the major features of the apparatus of the present invention. Strip 1 of picture hanger blanks, such as first blank 3, proceeds through the apparatus in the direction of arrow 5. The strip includes a plurality of substantially identical blanks having bodies which lie generally in a single plane. Each body defines at least one opening or "window" and a plurality of prongs. When initially formed, such as by the punch and die operation described above, the prongs lie in the same plane as the bodies. Later, one bends the prongs out of the plane of the body, so that they assume the form illustrated in U.S. Pat. No. 5,048,788. As noted above, this specification incorporates by reference the disclosure of the latter patent.

One can form the strip of hanger blanks with the progressive die described above, or by other means. The present invention does not include the specific means for forming the strip.

The strip entering the apparatus comprises a single, unitary piece; the strip thus includes a plurality of connected blanks.

Stock feed rod 7, controlled by a piston or other suitable apparatus (not shown), advances strip 1 through the apparatus. The feed rod can assume an extended and a retracted position. FIG. 1 shows the rod in the retracted position.

The stock feed rod 7 terminates at stock paw mount 9. Stock paw 11 pivots around a stock paw pin 13 inserted within mount 9. When the rod moves in the direction of arrow 5, the stock paw pushes the strip by engaging the leading edge of the window of one of the hanger blanks. When the rod moves in the opposite direction, the stock paw lifts slightly as the rod pulls the paw back, allowing the rod to move back without moving the strip. When the paw stops inside one of the windows, at least one edge of the paw touches stock guide 15.

The apparatus also includes anvil 17. The anvil moves up and down, severing the formed hanger blanks from the strip and pressing the newly-created hangers down into the picture backing material (not shown in FIG. 1). The anvil includes anvil paws 19 for holding the severed hanger. The anvil also includes prong forming tool 21, securely mounted to the main body of the anvil. When the anvil moves downward, the prong forming tool also moves downward. Because of its position directly over the next-to-last blank of strip 1, the prong forming tool bends the prongs of that blank. Upper blade 22 severs the first blank from the strip, when the anvil moves downward.

FIG. 1 shows the point in the operating cycle wherein the anvil has just retracted (moved upward as shown in the figure), after having pressed a hanger into a picture backing material (not shown in FIG. 1). Note that the prong forming tool has bent the prongs of the next hanger blank (momentarily located at the forward end of the strip as shown in FIG. 1); the prongs of the remaining blanks remain unbent. FIG. 1 thus shows the strip just before the feed rod advances the strip to position the next blank under the anvil.

Figure 2:
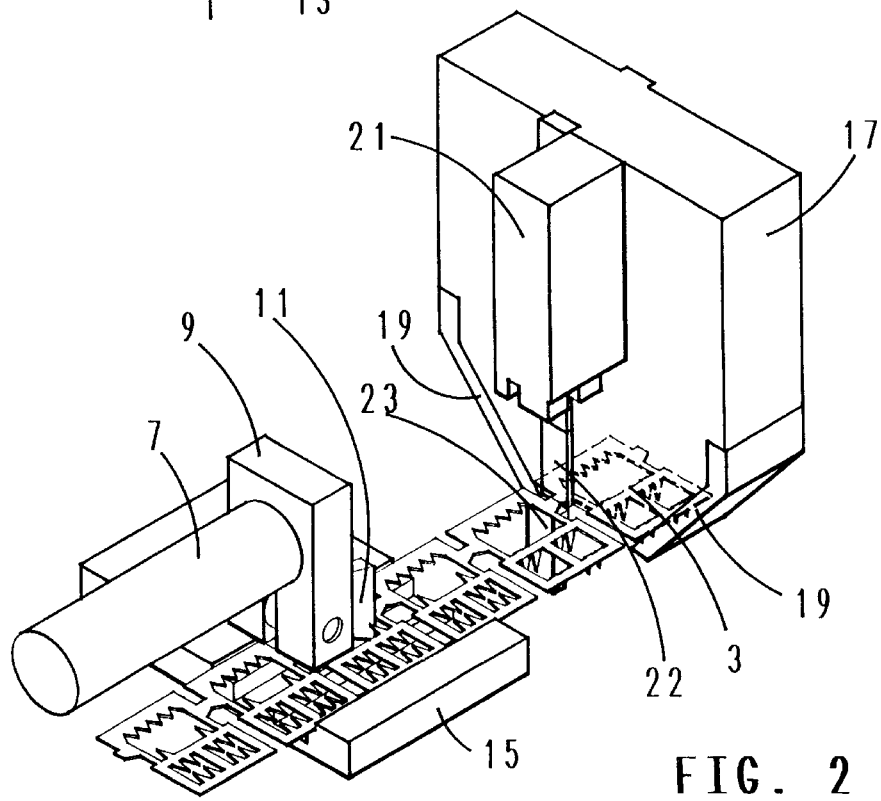
FIG. 2 provides a view similar to that of FIG. 1, but with the feed rod extended so that the first hanger blank rests immediately under the anvil.

FIG. 2 provides essentially the same view as FIG. 1, but with the feed rod in the extended position. Note that the first hanger blank 3 has advanced to a position directly under anvil 17. Because the anvil therefore obscures the first blank, FIG. 2 shows the first blank 3 in dotted outline. Both FIGS. 1 and 2 show a portion of lower cutting insert 23. Downward movement of the anvil causes blade 22 to create a shearing effect against the cutting insert 23, thereby cutting off the first hanger from the strip. The lower cutting insert forms an attachment to a magazine not shown in FIGS. 1 and 2 but described later.

Figure 3:
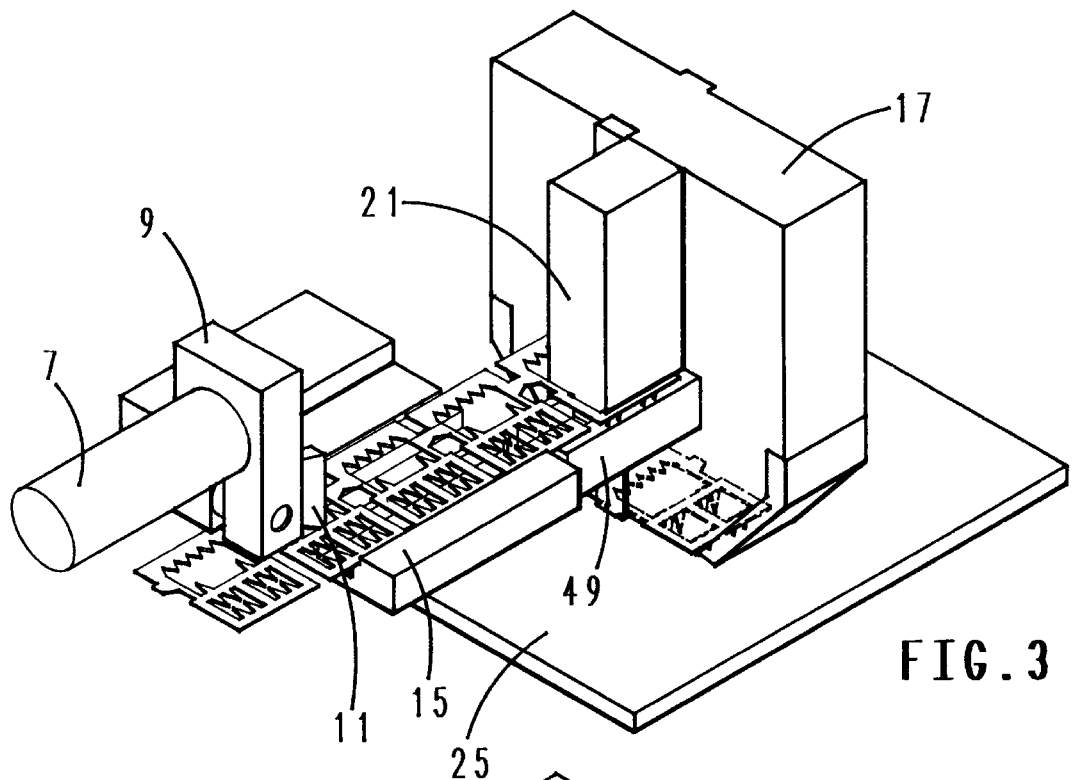
FIG. 3 provides a view similar to those of FIGS. 1 and 2, with the anvil extended so as to press a severed hanger into a picture backing material.

FIG. 3 shows the anvil in the extended position, about to press a hanger into a picture backing 25. One can make the picture backing of various materials such as pressed paper, corrugated paper board, Masonite, plywood, particle board, and firm woods such as pine or oak. As shown in FIG. 3, as the anvil presses the hanger into the backing material, the prong forming tool 21 engages the next hanger blank in the strip, and bends the prongs of that blank. Prong forming tool 21 presses the blank against prong form insert 49. One can bend the prongs at an angle of 90°, or one can bend the prongs at an angle of less than 90°. One can also form curved prongs. The amount and nature of the bending depends on the specific shape of the end of the prong forming tool. In any case, the prongs grasp the backing material such that the picture hanger becomes permanently affixed to that material. As the prongs enter the backing material, the anvil paws push back, thus releasing the hanger. The specification will describe the operation of the anvil paws in more detail later.

After the anvil retracts to its raised position, one can remove the picture backing, with its newly-inserted hanger, from the apparatus. A complete cycle of operation includes one downward and one upward movement of the anvil, as well as a forward and backward movement of the feed rod.

Figure 4:
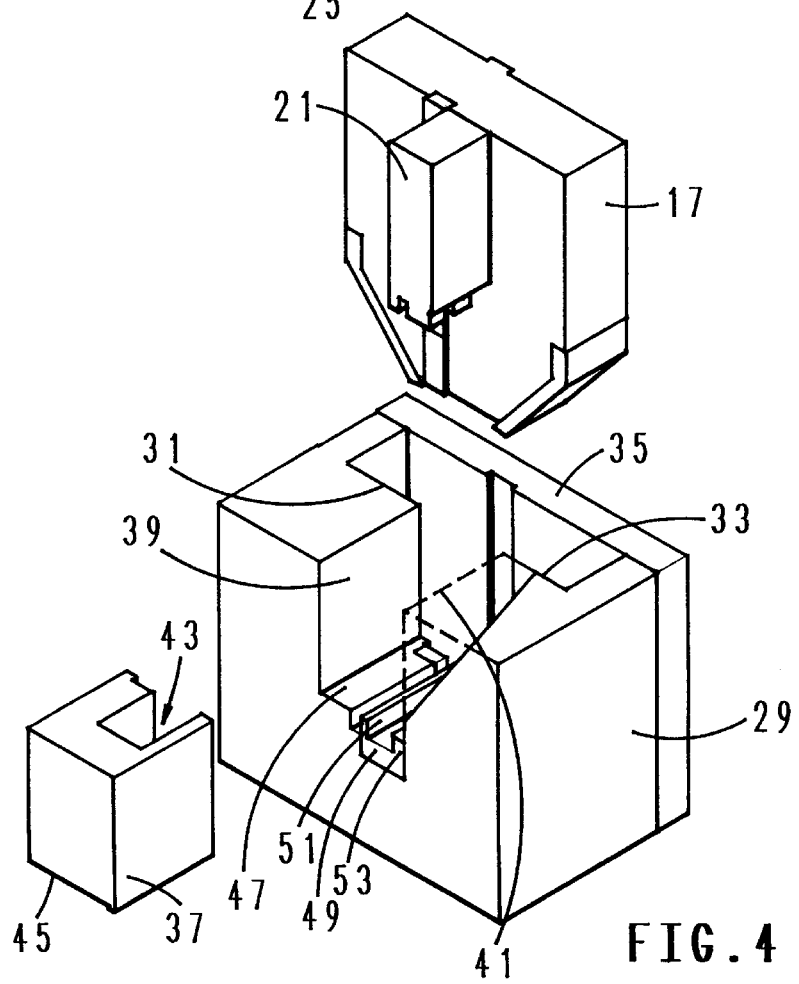
FIG. 4 provides an exploded perspective view of the anvil and magazine of the present invention.

FIG. 4 shows, in an exploded perspective view, the anvil and its supporting structure. The figure shows part of the magazine cut away, so as to illustrate more of its internal structure. Left cutout 31 and right cutout 33, together with magazine side 35, together define a slot which guides anvil 17. Magazine insert 37 fits into magazine 29 between the left side insert cutout 39 and the right side insert cutout 41. The magazine insert includes a prong forming tool cutout 43 which enables prong forming tool 21 to move downward without obstruction. The strip (not shown in FIG. 4) passes through a slot defined by strip cutout 45 on the top, left side insert cutout 39 on the left side, right side insert cutout 41 on the right side, and bottom insert cutout surface 47 on the bottom. By increasing the depth of strip cutout 45 of magazine insert 37, and by adding spring-loaded stock lifters (not shown) to bottom insert cutout surface 47, one can lift the continuous strip while the strip moves forward. This lifting would allow replacement of the prongs with star or rosette-type fastening elements, such as those shown in U.S. Pat. No. 4,785,531. The present invention includes the latter alternative.

Prong form insert 49 includes mandrels 51 and 53. The mandrels provide support for the hanger blanks during formation of the prongs. More specifically, prong forming tool 21 bends the prongs around the mandrels, so that the prongs become angled relative to the hanger body. Note that prong form insert 49 extends across only about one-half the distance between left side insert cutout 39 and right side insert cutout 41. Prong form insert 49 need only extend across the region of the blank which contains prongs. Note that both FIGS. 3 and 4 show the prong form insert 49. As in FIG. 4, one can also see from FIG. 3 that prong form insert 49 extends only part of the way across the length of the blank.

Figure 5:
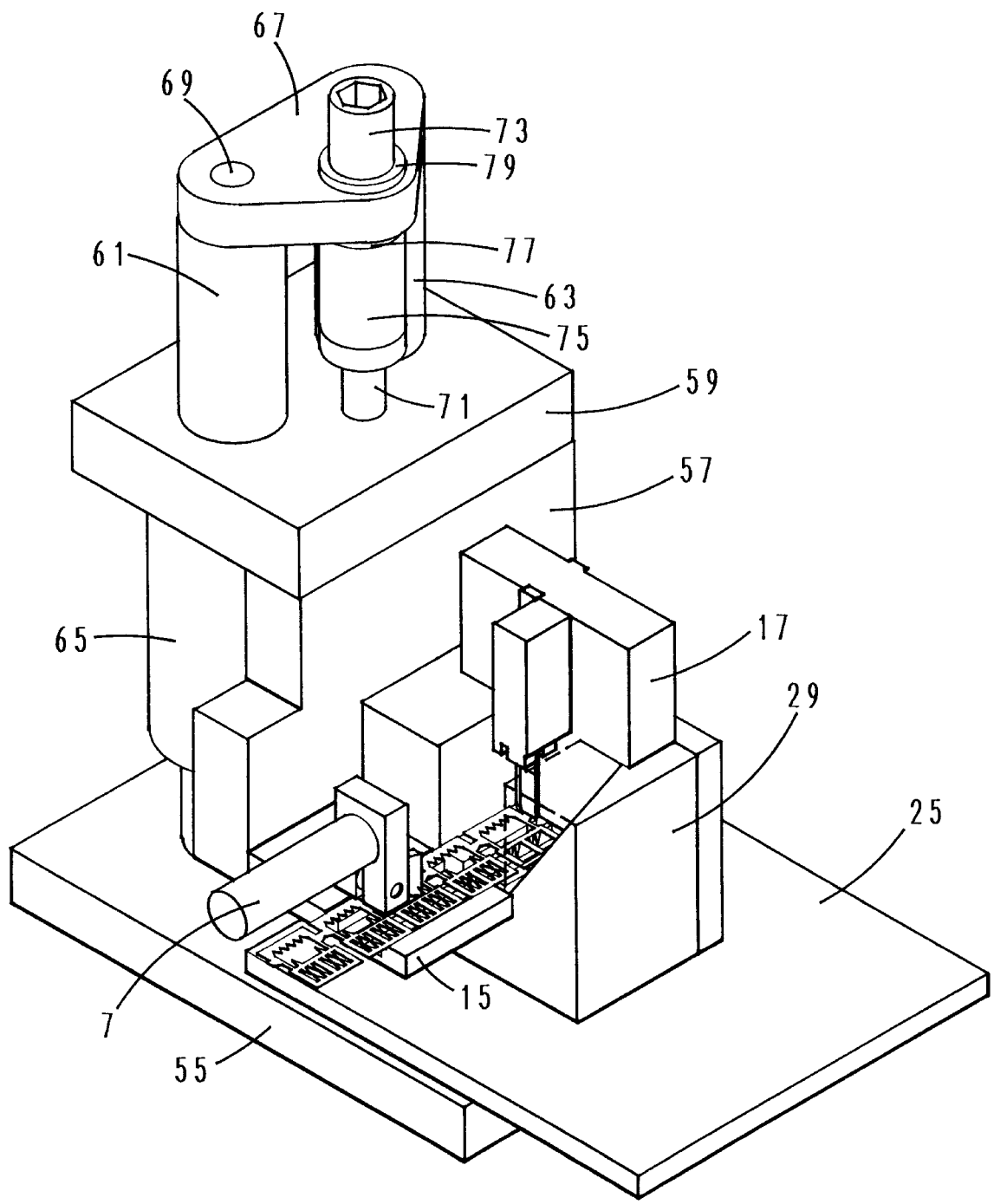
FIG. 5 shows, in a perspective view, the relationship between the apparatus of the present invention and a picture backing material, into which the apparatus inserts the hangers.

FIG. 5 shows the basic apparatus for applying a picture hanger to a picture backing. One places picture backing 25 on the top surface of base 55 of the apparatus. A portion of the backing lies under magazine 29. One attaches magazine 29 and stock guide 15 to vertical plate 57. The vertical plate can also hold a conventional power device (not shown in FIG. 5) which extends and retracts stock feed rod 7. A piston or similar power device (not shown in FIG. 5) extends and retracts anvil 17. A more complete description of a piston, and its associated components, appears below. One can move the piston with a pneumatic cylinder, a hydraulic cylinder, a solenoid, or other similar device of known construction.

Left post 61 and right post 63 attach to base 55. The left post extends through a guiding hole (not shown in FIG. 5) in left guide bushing 65. The right post extends through a similar hole in a right guide bushing (not shown in FIG. 5).

The apparatus further includes spring plate 67, attached to the tops of the left and right posts. FIG. 5 shows bolt hole 69 into which the left post becomes threaded or otherwise attached; the spring plate has a similar bolt hole for the right post. The left and right bushings attach to the horizontal plate 59.

A height adjusting bolt 71 screws into horizontal plate 59 so that one can adjust the distance between the bottom surface of the magazine and the top surface of the base. The further one threads the height adjusting bolt into the horizontal plate, the greater the distance between the bottom surface of the magazine and the top surface of the base.

The height adjusting bolt 71 has a second threaded section threaded into internal locknut 73, and which passes through holes in rubber spring 75, lower washer 77, spring plate 67, and upper washer 79. The further one adjusts the height adjustment bolt into the internal locknut, the more the rubber spring becomes compressed, and the greater the force applied to the anvil when it inserts the hanger into the picture backing 25. Instead of a rubber spring, one could also use a steel compression spring or its equivalent.

Figure 6:
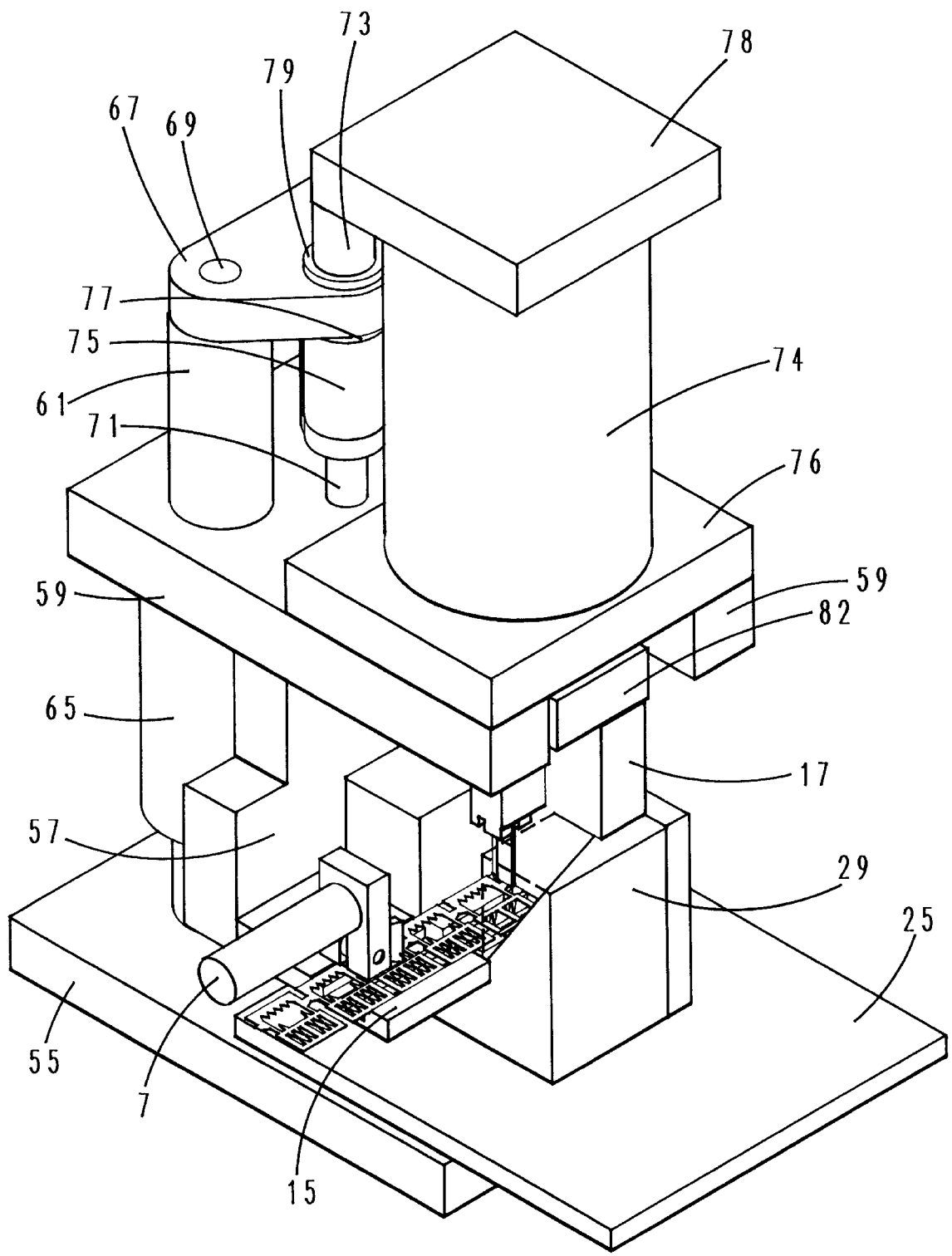
FIG. 6 shows a view similar to that of FIG. 5, except that FIG. 6 includes the cylinder which houses the piston for driving the anvil.

FIG. 6 shows a view similar to that of FIG. 5, except that FIG. 6 shows cylinder 74, mounted between cylinder base plate 76 and cylinder top plate 78. The cylinder top plate attaches to the cylinder, but has no attachment to any other component. The cylinder base plate attaches rigidly to horizontal plate 59. Cylinder 74 contains a piston, not visible in FIG. 6, which drives anvil 17.

Figure 7:
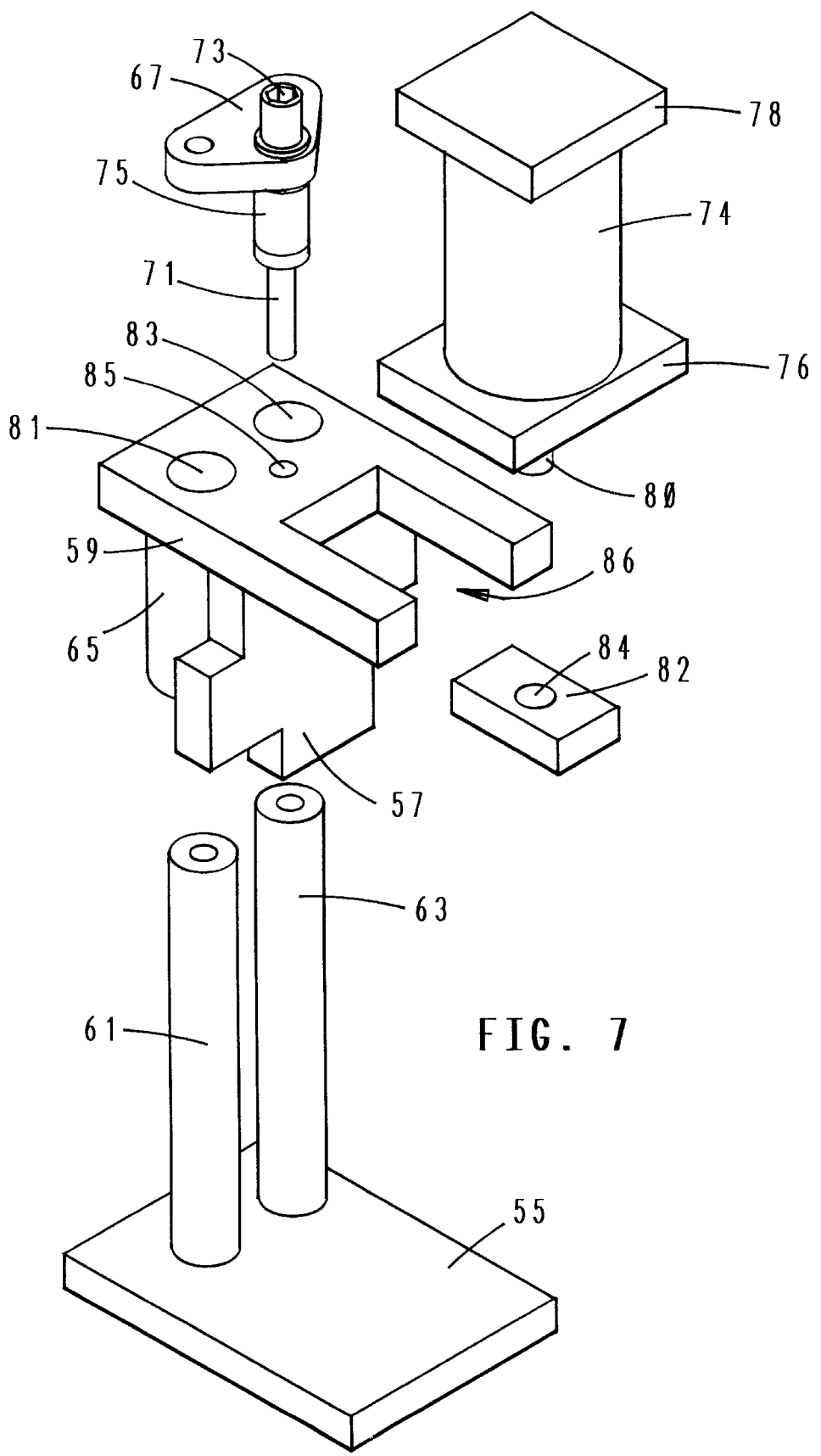
FIG. 7 provides an exploded perspective view showing more detail of some of the structural members of the apparatus of the present invention.

The exploded perspective view of FIG. 7 more fully illustrates the structure discussed above. Guiding holes 81 and 83 in horizontal plate 59 receive left and right posts 61 and 63, respectively. Threaded hole 85 receives the height adjustment bolt 71. FIG. 7 also shows piston rod 80 protruding from cylinder 74. Anvil connection plate 82 attaches rigidly to anvil 17 (see also FIG. 6, showing the plate above the anvil). Preferably, one screws the piston into a threaded hole 84 in plate 82. Anvil connection plate 82 does not attach directly to horizontal plate 59. But since the connection plate 82 attaches to the piston rod 80 which connects to cylinder 74, which attaches to the horizontal plate 59, one can consider the anvil connection plate 82 as attached to the horizontal plate. Therefore, for purposes of analyzing the movement of the components during operation, one can view the anvil itself as connected indirectly to the horizontal plate.

The C-hole 86 formed by horizontal plate 59 allows one to place the anvil connection plate at various positions along the anvil. Thus, the piston need not push the anvil at the center of the anvil, but instead can direct its force at an off-center location.

In the assembled apparatus, posts 61 and 63 connect rigidly to base 55 and spring plate 67. Thus, the distance between the base and the spring plate cannot change. The left guide bushing 65 and the corresponding right guide bushing (not visible in the figures) attach rigidly to horizontal plate 59. The guide bushings therefore can slide up and down along the posts 61 and 63. One connects the horizontal plate 59, the vertical plate 57, and magazine 29 together, so they all move as one unit. Also, the horizontal plate does not connect to the posts; the horizontal plate merely slides freely along the posts. The horizontal plate can move upward, against the elastic force of rubber spring 75, which, when compressed, tends to push the horizontal plate downward.

According to the invention, one controls piston rod 80 so that it extends farther down than necessary to insert a hanger fully into the picture backing. When the anvil moves downward (see FIGS. 6 and 7), the anvil presses down on the picture backing, which presses down on base 55. Base 55, which rests on a table or other work surface (not shown) cannot move lower as the anvil moves farther down. Therefore, the horizontal plate moves upward to accommodate the excess downward movement of the anvil. As the horizontal plate moves upward, it compresses rubber spring 75. Note that while the horizontal plate, vertical plate, left and right bushings, and the magazine all move upward together, the spring plate cannot move upward because the posts 61 and 63 hold the spring plate and the base 55 at a fixed distance. Thus, if the anvil attempts to travel farther down than the surface of the picture backing, the excess movement becomes absorbed by the spring, the horizontal plate moving upward by an amount sufficient to accommodate the excess movement.

The above-described structure permits the present invention to accommodate picture backings of varying thicknesses. One controls the piston so that the piston moves farther downward than necessary to insert any hanger fully into the thinnest of possible picture backings. Then, any excess downward movement of the piston becomes absorbed by the compression of the horizontal plate against the rubber spring. Therefore, one can insert many hangers into backings of varying thicknesses, with assurance that each hanger becomes fully inserted, and that all prongs of the next blank become properly formed. Moreover, the latter arrangement assures that the completion of the prong formation and the completion of the insertion occur substantially simultaneously.

Figure 8:
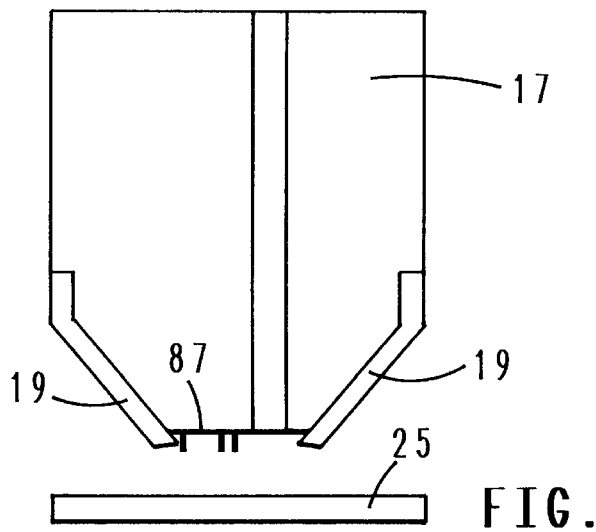
FIG. 8 provides a simplified elevational view of the anvil lowering the severed hanger towards the picture backing.
Figure 9:
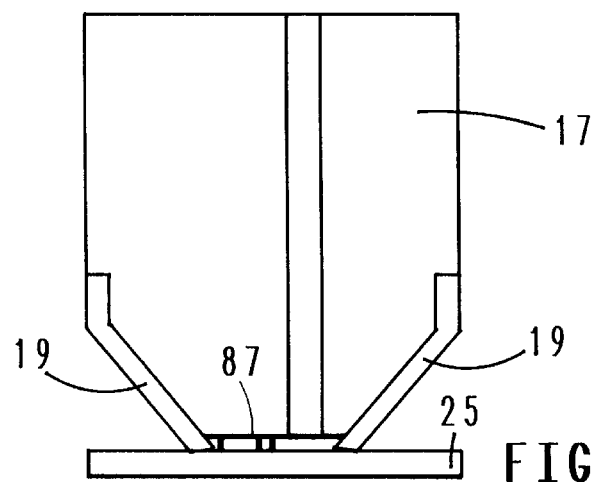
FIG. 9 provides a view similar to that of FIG. 8, wherein the anvil has reached the picture backing.
Figure 10:
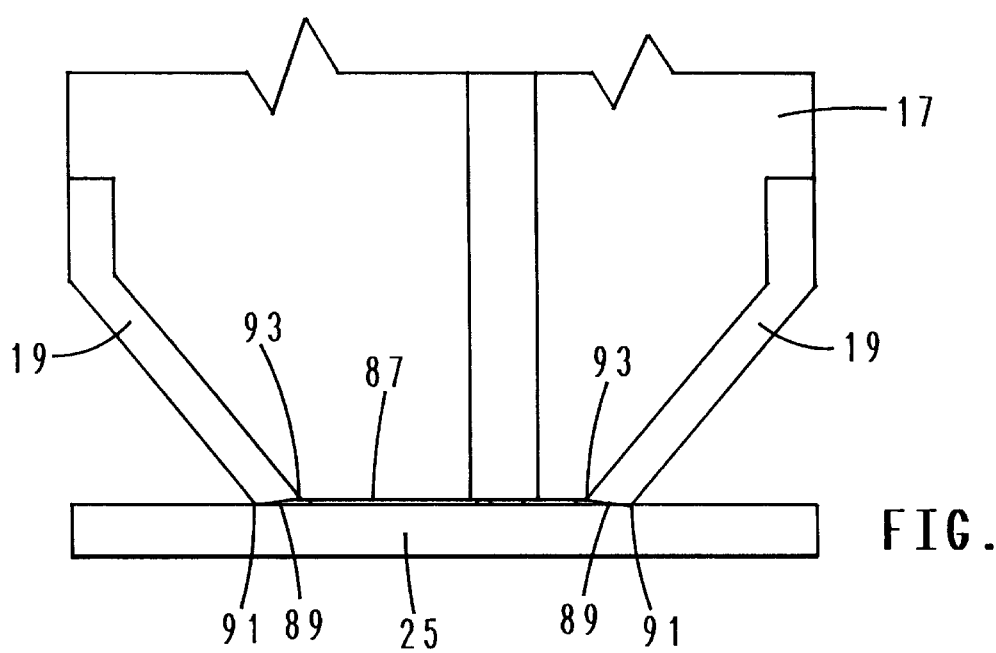
FIG. 10 provides a view similar to those of FIGS. 8 and 9, with the anvil paws about to release the hanger.

FIGS. 8, 9, and 10 show how the anvil paws carry the hanger to the vicinity of the picture backing. FIG. 8 represents anvil 17 with anvil paws 19 carrying formed hanger 87. The anvil paws can assume an extended or a retracted position; FIG. 8 shows these paws in the extended position. A spring means (not shown) insures that the anvil paws normally assume their extended position. As shown in FIG. 8, the extended paws define a gap smaller than the length of the hanger, so that the paws comprise means for holding the hanger.

In FIG. 9, the anvil has almost reached the picture backing 25. In FIG. 10, the anvil has inserted formed hanger 87 into backing 25. According to the present invention, one makes the end surfaces 89 of anvil paws 19 non-parallel with the picture backing. As the hanger presses further into the backing, the outer ends 91 of anvil paws 19 touch the backing before the inner ends 93. The relative movement of the anvil paws and the backing urges the paws, against the action of their springs (not shown) and towards their retracted position (diagonally upward in FIGS. 8–10). This movement occurs just before the hanger reaches its fully inserted position, due to the early push on the outer ends of the paws by the backing. Eventually, the paws disengage from the hanger, which has become firmly inserted into the backing. Thus, the anvil paws carry the hanger to the position of insertion, but also release the hanger when the hanger becomes fully inserted.

The operation of the apparatus therefore includes the following steps. The cycle begins with the strip positioned so that the first blank, with its prongs already bent, lies immediately below the anvil, and so that the second blank, with its prongs not yet bent, lies immediately below the prong forming tool. The anvil then moves downward, severing the first blank, and then carrying the completed hanger to the picture backing and inserting the hanger into the backing. While the anvil inserts the hanger, the prong forming tool forms the prongs of the next blank. The anvil retracts (moves upward), and the feed rod moves forward, advancing the strip so that the new first blank lies immediately below the anvil. The feed rod then retracts to its previous position. The system then repeats the cycle described above. Of course, one must provide the picture backing in the desired position and remove it after insertion of the hanger. One can perform the latter step manually, or by other means not forming part of this invention.

When the apparatus first begins to operate, one must perform a "dummy" stroke with the anvil. One advances the strip so that the first blank lies immediately under the prong forming tool, and so that no blank lies under the anvil. Thus, when the anvil moves downward, it does not insert a hanger, while the prong forming tool bends the prongs on the first blank. Then, when the rod advances the strip through the distance of one blank, the strip becomes positioned properly for the cyclical operation described above.

The invention may also include means for forming a flat strip into a strip of hanger blanks, and for feeding the strip into the insertion apparatus. Thus, one can combine and automate the steps of forming the strip of hanger blanks and inserting the blanks into the picture backing. One can form the strip and immediately and automatically pass the strip to the apparatus described above.

Although the above description speaks of inserting a hanger into a picture backing, one can also use the invention to insert hangers into other structures. For example, one can use the present invention to insert a hanger into a wooden picture frame. One can also use the invention to insert hangers into mirrors (which have backings and/or frames into which one can insert prongs), plaques, signs, bulletin boards, poster boards, or the like.

Note that when one uses the apparatus and method of the present invention, the hanger becomes fully inserted into the material, and lies flat against the material. Thus, one can easily stack the pictures (or other items) with the inserted hangers, without wasting appreciable space.

One can also use two or more machines, of the type described in this specification, to insert several picture hangers simultaneously into the same piece of material. Picture backings often contain multiple hangers, to give the user the choice of hanging a picture either horizontally or vertically. The present invention satisfies the latter need without requiring substantial additional labor.

The reader skilled in the art will appreciate that one can modify the invention in other ways. For example, one can use various means for powering the anvil and the feed rod. One can vary the structure of the anvil and its associated prong forming tool. The apparatus can use different resilient means, instead of the rubber spring, to perform the same function. One can thus vary the invention considerably, within the spirit and scope of the following claims.

What is claimed is:

1. Apparatus for inserting picture hangers into picture backings, each picture hanger having a body with a plurality of prongs extending from the body, the picture hangers being provided in the form of a unitary strip of generally flat blanks, the strip having a first blank and a next blank, the first blank being located at an end of the strip, the strip having a longitudinal axis, the apparatus comprising means for advancing the strip, and anvil means, movable in a direction generally perpendicular to the strip, for severing the first blank from the strip and inserting the first blank into the backing, and prong forming means, attached to the anvil means, for bending the prongs of the next blank after the first blank is severed, wherein the prong forming means is displaced in its entirety relative to the anvil means, along the longitudinal axis of the strip, the prong forming means being positioned away from the first blank and towards the next blank, wherein the anvil means includes paw means for holding the blank nearest the forward end after said blank nearest the forward end has been severed, and until said blank is inserted into the picture backing material, the paw means having longitudinal axes, wherein the anvil means has a direction of movement, wherein the paw means have distal ends extending towards the picture backing material, wherein the distal ends of the paw means have end surfaces which are disposed non-perpendicular to the direction of movement of the anvil means, wherein the paw means each have a inner and outer end, wherein the outer end extends farther outward in the direction of movement of the anvil means than the inner end, and wherein the end surfaces of the paw means are oblique relative to the respective longitudinal axes of the paw means.

2. Apparatus for inserting picture hangers into picture backing materials, the picture hangers being provided in the form of a strip of pre-formed picture hanger blanks, the strip including a plurality of said blanks, the blanks being initially connected together, each of said blanks having a body and at least one prong integrally formed with the body, said at least one prong and the body initially lying in generally the same plane, the body defining at least one opening which is entirely surrounded by the body, the opening having a contour, the insertion apparatus comprising:

a) means for advancing the strip, wherein the strip includes a forward end and a rearward end, and wherein there is a blank nearest the forward end and a blank adjacent to the blank nearest the forward end, b) anvil means, the anvil means being vertically movable, the anvil means comprising means for severing the blank nearest the forward from the strip and for pressing the blank nearest the forward end into the picture backing material, and c) prong forming means, the prong forming means including a holder portion and at least one projection extending from the holder portion, the holder portion being mounted on the anvil means, the projection being shaped to correspond substantially with the contour of said opening in said blank, the projection comprising means for bending said at least one prong on the blank adjacent to the blank nearest the forward end after the anvil means has severed and pressed the blank nearest the forward end, wherein the prong forming means is displaced in its entirety from the anvil means, the prong forming means being positioned towards the rearward end of the strip, wherein the anvil means includes paw means for holding the blank nearest the forward end after said blank nearest the forward end has been severed, and until said blank is inserted into the picture backing material, the paw means having longitudinal axes, wherein the anvil means has a direction of movement, wherein the paw means have distal ends extending towards the picture backing material, wherein the distal ends of the paw means have end surfaces which are disposed non-perpendicular to the direction of movement of the anvil means, wherein the paw means each have a inner and outer end, wherein the outer end extends farther outward in the direction of movement of the anvil means than the inner end, and wherein the end surfaces of the paw means are oblique relative to the respective longitudinal axes of the paw means.

3. In an apparatus for inserting picture hangers into picture backings, the hangers being provided as a strip of generally flat blanks, the apparatus including means for forming prongs in said blanks and for severing a blank from said strip, and for pressing a severed blank into a picture backing, the improvement wherein the severing means includes a pair of paws for holding the severed blank until said severed blank has been substantially fully inserted into the picture backing, the paws having longitudinal axes, wherein the severing means has a direction of movement, wherein the paws have distal ends extending towards the picture backing, wherein the distal ends of the paws have end surfaces which are disposed non-perpendicular to the direction of movement of the severing means, wherein the paws each have a inner and outer end, wherein the outer end extends farther outward in the direction of movement of the severing means than the inner end, and wherein the end surfaces of the paws are oblique relative to the respective longitudinal axes of the paws.

4. The improvement of claim 3, wherein the end surfaces of the paws ke an obtuse angle relative to the longitudinal axes of the paws.

5. The improvement of claim 3, wherein the severed blank has a surface, and wherein the end surfaces of the paws make an acute angle with the surface of the severed blank.

* * * * *